United States Patent [19]
Robinson

[11] Patent Number: 5,940,259
[45] Date of Patent: Aug. 17, 1999

[54] VOLTAGE SURGE PROTECTOR FOR ELECTRONIC CIRCUITS WITH SEMICONDUCTOR COMPONENTS

[75] Inventor: Michael John Robinson, Scituate, Mass.

[73] Assignee: Pacific Scientific Company, Weymouth, Mass.

[21] Appl. No.: 09/010,023

[22] Filed: Jan. 21, 1998

Related U.S. Application Data

[63] Continuation-in-part of application No. 08/888,028, Jul. 3, 1997, abandoned.

[51] Int. Cl.$^6$ ............................................. H02H 9/00
[52] U.S. Cl. ............................ 361/56; 361/111; 361/118; 361/127
[58] Field of Search ................................ 361/56, 91, 111, 361/104, 103, 118, 117, 119, 127

[56] References Cited

U.S. PATENT DOCUMENTS

| | | | |
|---|---|---|---|
| 3,141,108 | 7/1964 | Benner et al. | 313/321 |
| 3,249,719 | 5/1966 | Misare et al. | 200/115 |
| 4,161,012 | 7/1979 | Cunningham | 361/128 |
| 4,616,286 | 10/1986 | Breece | 361/56 |

OTHER PUBLICATIONS

Szpor, S., "LV Expulsion Arrester", *Archiwum Elektrotechniki*, pp. 1103–1105 (1976).

Fisher Pierce, *Electronic Outdoor Lighting Control*—Series 7570B, 2 page Advertisement, Pacific Scientific (1997).

Fisher Pierce, *Electromechanical and Electronic Photocontrol*, —Series 7700 & Series 7570B, 1 page advertisement, Pacific Scientific (no year available).

Fisher Pierce, *Electromagnetic Relay Outdoor Lighting Control*, —Series 7700, 6 page advertisement, Pacific Scientific (1996).

Fisher Pierce, *Photoelectronic Outdoor Lighting Control*, —Series 7570, 2 page advertisement, Pacific Scientific (1996).

Fisher Pierce, *Electronic Photocontrols*, —Series 7570, Pacific Scientific, pp. 1–17 (1996).

*Primary Examiner*—Jeffrey Gaffin
*Assistant Examiner*—Stephen Jackson
*Attorney, Agent, or Firm*—Lahive & Cockfield, LLP

[57] ABSTRACT

A surge protection circuit provides multiple stages of protection for an electronic circuit having semiconductor components from damage due to passage of excessive amount of current during a line borne voltage surge. In particular, this circuit can protect any relay load switching device that requires an electronic control circuit. The circuit of the invention achieves performance superior to that of conventional surge protectors, such as those employing metal oxide varistors, by employing an expulsion arrester as the last stage of a multi-stage protection technique against voltage surges on power lines. Low impedance electrical paths parallel to the expulsion arrester and to the electronic circuitry provide protection before the arrester switches. One embodiment employs a zener diode and a silicon controlled rectifier to provide two such parallel electrical paths.

56 Claims, 11 Drawing Sheets

VOLTAGE SURGE PROTECTOR FOR ELECTRONIC CIRCUITS WITH SEMICONDUCTOR COMPONENTS

RELATED APPLICATION

This application is a continuation in part of the commonly assigned and copending application entitled VOLTAGE SURGE PROTECTOR FOR ELECTRONIC PHOTO CONTROL CIRCUITS, Ser. No. 08/888,028, filed Jul. 3, 1997.

BACKGROUND

This invention relates generally to methods and apparatus for the protection of electronic semiconductor circuitry against voltage surges. In particular, the invention relates to the protection against such voltage surges without relying on metal oxide varistors.

Many electronic circuits that employ semiconductor components require protection against voltage surges, particularly those carried on power lines. These so-called line borne voltage surges, which typically reach values in excess of 1000 V, can destroy semiconductor components. Surge protectors for such circuits conventionally employ metal oxide varistors ("MOV") for protection from voltage surges. For example, photo controls, which are widely used throughout the world for switching outdoor lighting, traditionally utilize metal oxide varistors for protection from line borne voltage surges. One such product, the 7570 series of electronic photo controls marketed by the Fisher Pierce Division of Pacific Scientific employs single or dual metal oxide varistors to suppress line transients.

The clamping voltage across an MOV is dependent on the current through it, and on its Joule rating. The Joule rating of an MOV is a measure of the transient energy that the MOV can dissipate without failure. For example, an MOV with a Joule rating of 160 and with a 320 V rating typically clamps the voltage at approximately 1000 V for a current of approximately 3000 A (ampere). The voltage across the MOV, however, can rise above 1000 V if the current increases further during a voltage surge. This excessive voltage can negate the protective capability of the MOV because the threshold voltage at which semiconductor components are damaged is normally about 1000 V.

The ability of an MOV to clamp the voltage across a semiconductor circuit is therefore limited by its Joule rating. Further, metal oxide varistors are not capable of providing protection against repetitive voltage surges separated by time intervals of less than a few minutes. This is due to their slow recovery, which typically is at least a few minutes after a surge. Given that repetitive line voltage surges are common, it is desirable to provide an apparatus and method for the protection of semiconductor circuitry against such surges.

The common failure mode of an MOV is understood to be the result of thermal overloading that occurs when an unusually high current passes through the device. This overload can cause a permanent short circuit which, in turn, increases the follow through current to the triggering threshold of a circuit breaker. The triggering of the circuit breaker then switches off the power to the semiconductor circuitry. It is, therefore, important to find alternative circuits for the protection of semiconductor circuits, including photo controls, against voltage surges without the limitations imposed by the intrinsic properties of an MOV.

Accordingly, it is an object of this invention to provide protection for an electronic circuit against line borne and other voltage surges, beyond the protection afforded by a metal oxide varistor.

It is another object of this invention to provide apparatus and method for the protection of semiconductor circuits against repetitive voltage surges, beyond the protection afforded by a metal oxide varistor.

The invention is next described in connection with illustrated embodiments. It will, however, be obvious to those skilled in the art that various modifications can be made to the embodiments without departing from the spirit or scope of this invention.

SUMMARY OF THE INVENTION

This invention protects an electronic circuit that has semiconductor components from damage during a voltage surge by employing an expulsion arrester that provides one stage of protection for the semiconductor circuitry in a multi-stage protection technique. The invention provides a number of alternative low impedance electrical paths to ground at various stages of a voltage surge. These alternative paths are either normally conductive with a conductance that is substantially larger than that of the electronic circuit or are normally non-conductive and become conductive at voltages less than the triggering threshold of the expulsion arrester that provides one stage of protection. The invention can protect a variety of devices against line borne voltage surges, e.g., any relay load switching device that requires an electronic control circuit. A partial list of such switching devices include electronic photo controls, inverse ratio photo controls, upward facing photo controls, electronic timer switches, electronic thermostats, and electronic level sensing circuits.

The incorporation of an expulsion arrester, instead of an MOV device, for clamping voltage surges provides certain advantages. An expulsion arrester provides superior protection through its ability to handle high levels of follow through current, in contrast to an MOV device which is limited in this regard because of a lower Joule rating. Furthermore, in contrast to an MOV device, the faster recovery time of an arrester enables it to protect a semiconductor circuit and protect a load connected across the power lines against repetitive voltage surges. In addition, creation of a permanent short circuit is not one of the failure modes of an expulsion arrester. Thus, a surge protector incorporating an expulsion arrester, instead of an MOV device, provides superior performance because it is able to handle higher levels of follow through current, because it is able to protect electronics against repetitive voltage surges, and because it does not have a failure mode which would result in a permanent short circuit.

It is, however, not practical to protect a semiconductor device against voltage surges by connecting it directly to an expulsion arrester because the clamping voltage of an arrester, typically above 2500 V, is usually higher than the breakdown voltage of the semiconductor device.

The invention employs an expulsion arrester in a voltage protection circuit for semiconductor circuitry by providing protective electrical paths, in addition to an electrical protective path provided by the expulsion arrester. These additional paths are either normally conductive or become conductive in response to electrical overload conditions smaller than those that activate the expulsion arrester, and protect the circuitry during a voltage surge before the arrester triggers. Thus, the combination of the expulsion arrester and the additional protective paths clamp the voltage across the semiconductor circuit below a selected threshold throughout the duration of the surge.

In one preferred embodiment of the invention, an expulsion arrester is connected parallel to the semiconductor circuit to provide one stage of protection. The basic components of expulsion arresters typically consist of a housing filled with some gas, and a spark gap. As the voltage across the gap exceeds a certain threshold, the electric field generated within the gap causes dielectric breakdown of the gas within the housing of the arrester, thus providing a low impedance path for current. For example, U.S. Pat. No. 3,141,108, herein included by reference, discloses a lightning arrester in which the annular edge of a conducting disk and the annular edge of the housing of the arrester form a spark gap. This arrester also incorporates an insulator block positioned in the proximity of the gap. The triggering of the arrester subjects this insulator block to a high temperature arc that causes the block to liberate a gas which helps extinguish the arc.

In one feature of the invention, a silicon controlled rectifier ("SCR") provides another low impedance path, alternative to the one that includes the expulsion arrester. One aspect of the present invention is utilizing a switching property of an SCR that is due to an intrinsic property of such devices, namely the capacitance of the reverse-bias depletion region, to trigger the SCR in response to a rapid rise of the voltage at its anode. Such a mode of triggering is normally considered spurious and is suppressed by employing networks of resistors and capacitors that limit the rate of the rise of the voltage at the anode of the SCR. The present invention, however, employs this intrinsic property of an SCR to provide one stage of protection against voltage surges prior to triggering of the expulsion arrester.

Another aspect of the invention is utilizing a zener diode, connected parallel to an expulsion arrester, as one stage of protection. The zener diode clamps the voltage at its breakdown voltage until the surge voltage exceeds a certain threshold at which other stages of protection, such as an SCR, start triggering to provide low impedance electrical paths to ground.

In one embodiment of the invention, a current limiting resistor, connected in series with the semiconductor circuitry, provides one stage of protection by limiting the current through the circuitry during a surge. In such an embodiment, the resistance of the current limiting resistor is chosen such that it provides adequate current for the normal operation of the semiconductor circuit, and it limits the current during a surge below a detrimental threshold until other stages of protection start providing low impedance paths to ground.

Another aspect of the present invention is employing an alternating current ("AC") relay coil, connected in series with an SCR, to protect the SCR from excessive current flow during a voltage surge. The protection of the SCR by the relay coil is feasible because a surge with a short rise time typically has many high frequency components. Since the impedance of a relay coil is proportional to frequency, the relay coil presents a high impedance to the flow of current during a voltage surge.

The invention can be practiced with a combination of an expulsion arrester, a current limiting resistor, and an SCR, or with a combination of an expulsion arrester, a zener diode, and an SCR, or with a combination of an expulsion arrester and an SCR. In addition, it is obvious to those with ordinary skill in the art that although the preferred embodiments of the invention do not employ an MOV, the invention can of course be practiced with an MOV.

Thus, a surge protector according to a preferred embodiment of the invention employs an expulsion arrester as one stage of protection, and also supplies at least one stage of protection in addition to the expulsion arrester to protect the circuitry before the triggering of the expulsion arrester.

These and other features of the invention are more fully set forth below with reference to the detailed description of illustrated embodiments, and the accompanying figures.

BRIEF DESCRIPTION OF THE DRAWINGS

The foregoing and other features and objects of the invention will be apparent from the following description and the accompanying drawings, in which.

DESCRIPTION OF ILLUSTRATED EMBODIMENTS

Figure 1:
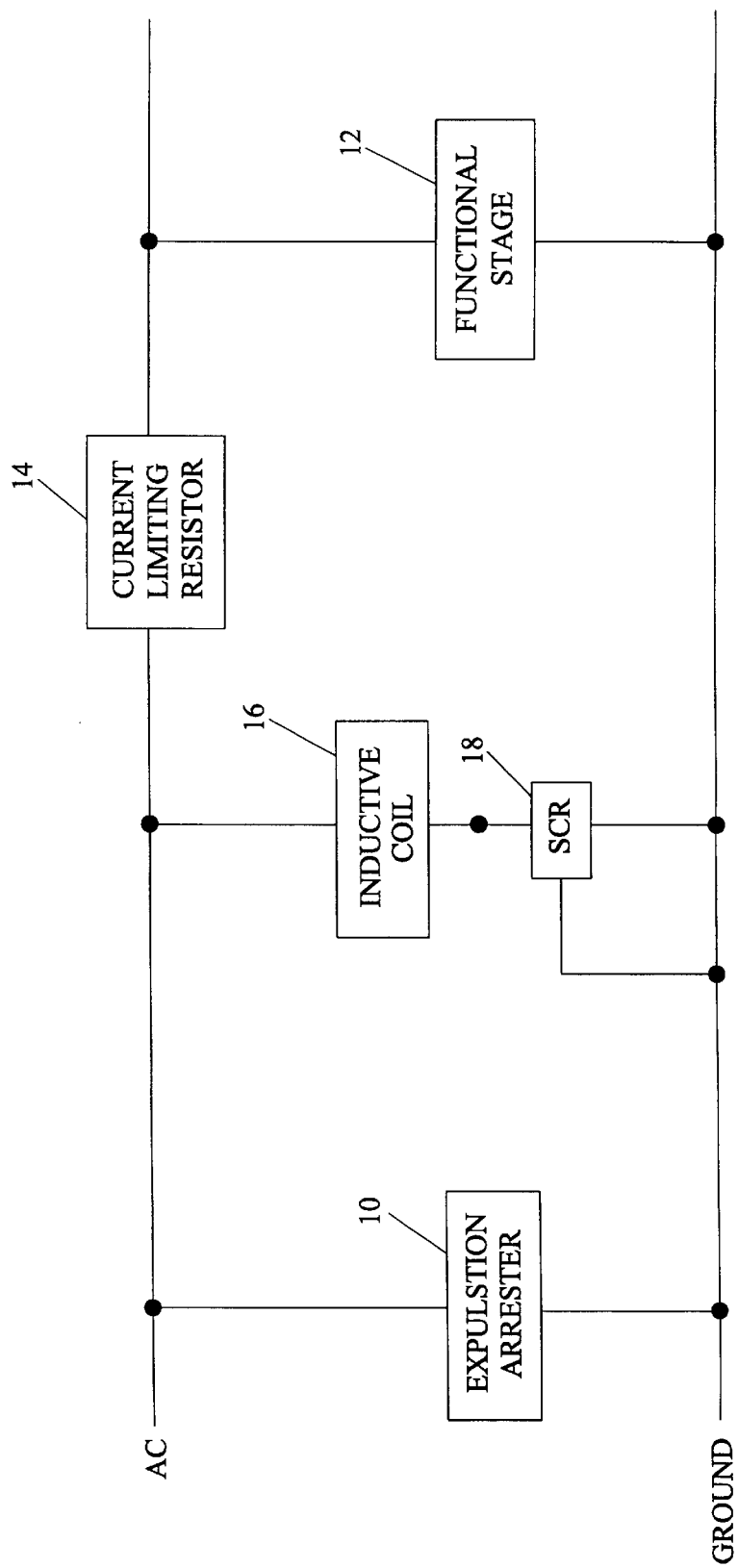
FIG. 1 is a schematic diagram of a circuit according to the invention to protect a functional stage against voltage surges, and incorporating multiple protective stages that include a current-limiting resistor, an SCR, and an expulsion arrester to protect a functional stage against voltage surges.

FIG. 1 shows one embodiment of the invention in which an expulsion arrester 10 is connected between the AC line and ground. A functional stage 12 is connected at one end to one terminal of a current limiting resistor 14 and at its other end to ground. The opposite end of the current limiting resistor is connected to the AC line. The functional stage can be a load switching device such as a photo control circuit.

Further reference to FIG. 1 shows a series combination of an inductive coil 16 and an SCR 18, which is a semiconductor switch, connected between the AC line and ground. The anode of the SCR is attached to one terminal of the inductive coil and its gate and cathode terminals are grounded.

The resistance of the current limiting resistor is chosen in a manner known in the art to provide adequate current for normal operation of the functional stage, and to limit the current during a voltage surge to a value that is not detrimental to the circuit. Thus, during a voltage surge, the current-limiting resistor provides a first stage of protection. The SCR provides a second stage of protection by switching, before the expulsion arrester triggers, to clamp the voltage across the circuit to a few volts. Meanwhile, the inductive coil limits the current through the SCR during a surge, thus protecting it from damage. The expulsion arrester provides the last stage of protection by switching on as the voltage exceeds approximately 2500 V, thus providing an electrical path parallel to the functional stage with an impedance substantially lower than that of the functional stage.

Figure 2:
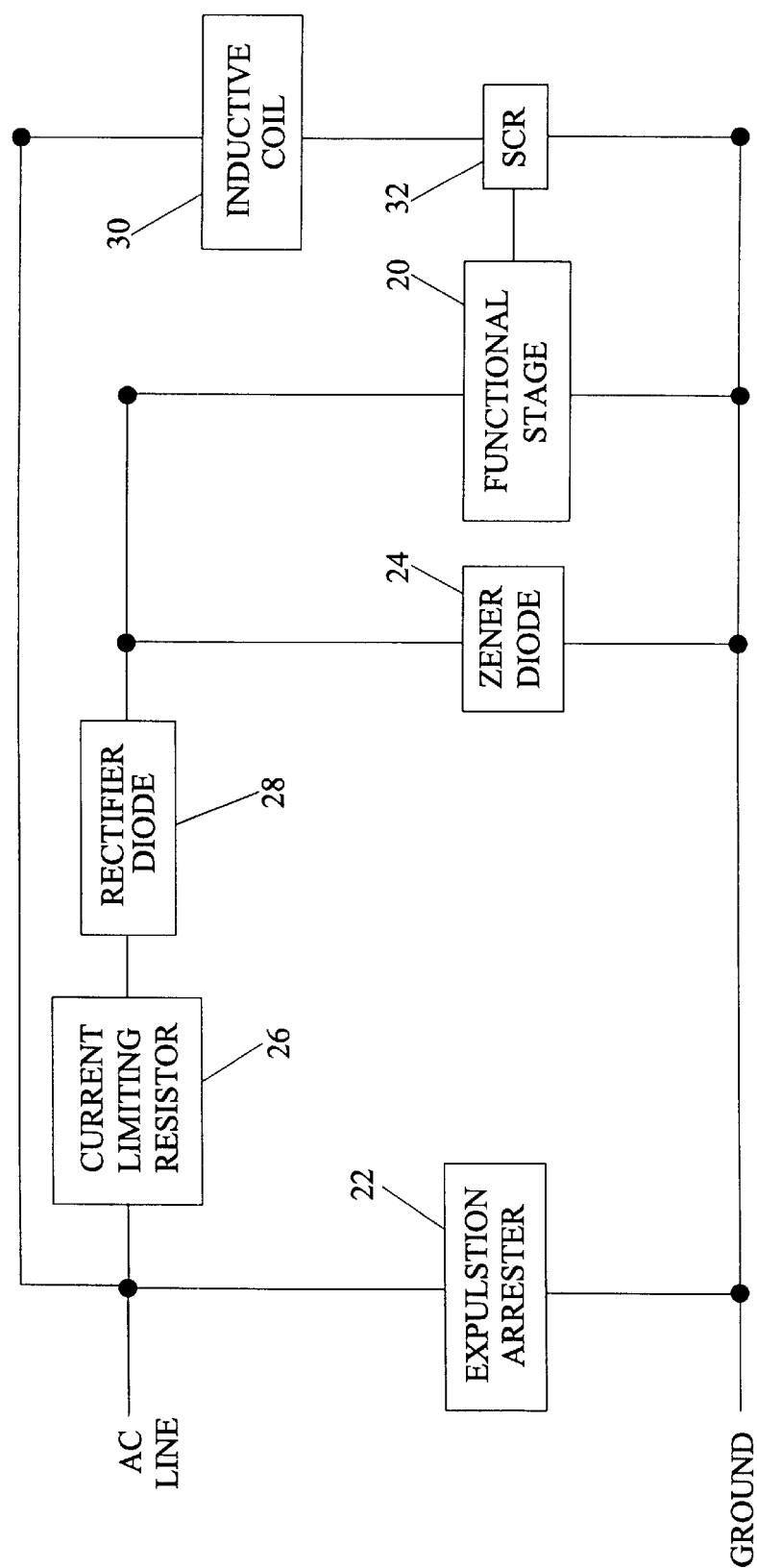
FIG. 2 is a schematic diagram of another protective circuit according to the invention that in addition to the components shown in FIG. 1, has a zener diode in parallel with the functional stage, and a rectifier diode electrically in series with the current limiting resistor.

FIG. 2 shows another embodiment of an overload protection device having a functional stage 20. The overload device includes an expulsion arrester 22 that is electrically connected between the AC line and ground, and a zener diode 24 that is connected in a parallel electrical path to both the expulsion arrester and the functional stage. The device further includes a current-limiting resistor 26 that is attached at one terminal to the AC line. The opposite terminal of the current-limiting resistor is connected to one terminal of a rectifier diode 28 whose opposite end is connected to the cathode terminal of the zener diode. Further reference to FIG. 2 shows an inductive coil 30 that is connected at one end to the AC line and at its opposite end to the anode terminal of an SCR 32 whose cathode terminal is grounded and whose gate terminal is attached to the functional stage.

The zener diode provides a first stage of protection against voltage surges by clamping the voltage at its reverse breakdown value. The rectifier diode provides half-wave rectification of the AC voltage, and the current limiting resistor provides the zener diode with a bias current that ensures that the voltage across the zener diode is at its breakdown value. In addition, the current limiting resistor protects the zener diode against excessive current flow during the surge. The current through the resistor during a voltage surge increases because clamping of the voltage by the zener diode causes a large voltage drop across the combination of the rectifier diode and the resistor, thus resulting in an increase in the current through the resistor. The value of the resistor is chosen such that it limits the current through the zener during a voltage surge below a certain threshold to protect it from damage. Similar to the previous embodiment, the SCR provides the second stage of protection by clamping the voltage across the functional stage to a few volts before the expulsion arrester triggers. The expulsion arrester triggers as the surge voltage exceeds approximately 2500 V, thus providing the last stage of protection.

Figure 3:
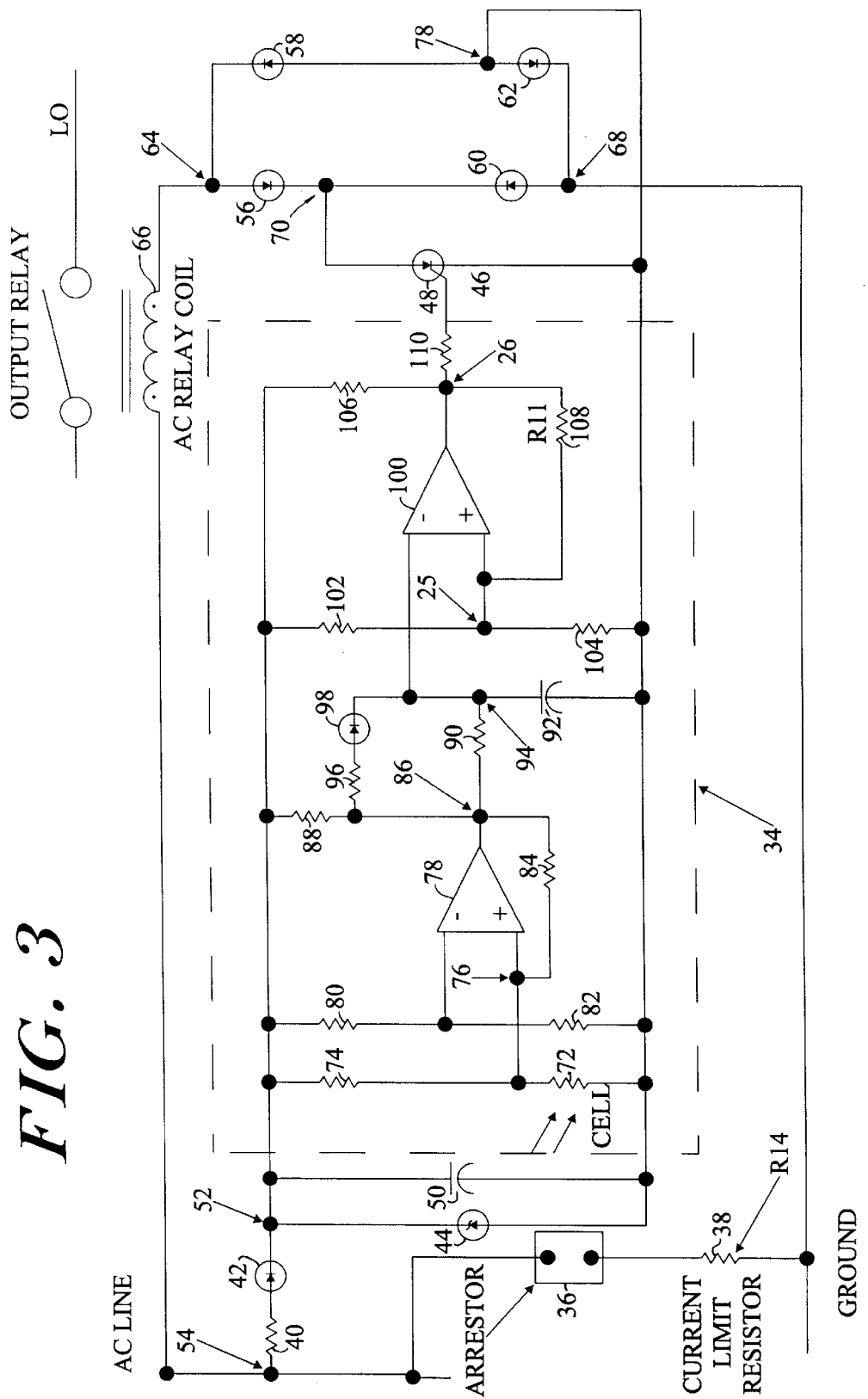
FIG. 3 shows a protective circuit similar to that of FIG. 2 in which the functional stage is a photo control circuit.

FIG. 3 shows a surge protection circuit according to yet another embodiment of the invention that clamps the voltage across a functional stage 34 at a value which is not detrimental to the circuit. The illustrated functional stage is a photo control circuit that responds to a change in the ambient daylight level, and switches on the power to a luminaire at dusk and switches it off again at dawn.

The circuit of FIG. 3 has an expulsion arrester 36 connected in series in an electrical path between the AC line and ground. The electrical path also includes a current limiting resistor 38, connected in series with the expulsion arrester. As the voltage across the combination of the expulsion arrester and the current limiting resistor exceeds approximately 2500 V, a dielectric breakdown of the gas in the housing of the expulsion arrester occurs, providing a low impedance path for current. The passage of a high current through the current limiting resistor causes its temperature to rise. This rise in temperature results in an increase in the resistance of the current limiting resistor because the resistor is chosen to have a positive thermal coefficient of resistance. The increased resistance results in an increase of the voltage drop across the resistor and a decrease of the voltage drop across the expulsion arrester, thus limiting the current through the arrester and eventually extinguishing the discharge within the housing of the arrester.

With further reference to FIG. 3, a resistor 40 is connected between the high voltage terminal of the AC line and the anode of a rectifier diode 42 whose cathode terminal is connected to the cathode terminal of a zener diode 44. The rectifier diode provides half-wave rectification of the AC voltage. The value Or the resistor 40 is chosen in a manner known in the art such that the current through the zener diode during the normal operation of the device is within an acceptable range, and during a voltage surge, it is below the momentary rating of the zener diode. The opposite terminal of the zener diode is connected to the cathode terminal 46 of a silicon controlled rectifier 48. A capacitor 50, connected in parallel with the zener diode, provides smoothing of voltage fluctuations across the photo control circuit. The zener diode 44 clamps the voltage at a circuit junction 52 at its breakdown voltage. Under this operating condition, a large voltage drop that develops between junctions 52 and 54 produces a current through the resistor 40, the rectifier diode 42, and the zener diode 44.

Further referring to FIG. 3, a full-wave bridge rectifier, formed by diodes 56, 58, 60, and 62, is connected at one bridge terminal 64 to an AC relay coil 66 and at the opposed bridge terminal 68 to the electrical ground. The opposite end of the relay coil is connected to the high voltage terminal of the AC line. During periods of relatively low ambient light intensity, i.e., night time, the silicon controlled rectifier is off, thus de-energizing the AC relay coil. If a voltage surge appears at circuit junction 54, the rapid rise of the voltage at the anode 70 of the silicon controlled rectifier 48 causes it to switch on, thus clamping the voltage between circuit junctions 64 and 68. The AC relay coil limits the current through the silicon controlled rectifier during a voltage surge because the impedance of the AC relay coil is high for a voltage surge with a rapid rise time.

The remainder of the illustrated circuit switches the silicon controlled rectifier and the AC relay coil as the intensity of the ambient light changes between a selected ambient brightness, e.g., day light, and a selected darkness, e.g., night. In particular, further referring to FIG. 3, a photo cell 72 is connected in series with a resistor 74, and the series combination of the photocell and the resistor is connected in parallel to the zener diode 44. The connecting junction of the photocell 72 and the resistor 74 is electrically connected to the positive input terminal 76 of a comparator 78. The combination of resistors 80 and 82, which are attached electrically in series, is connected in parallel to the zener diode 44. The negative terminal of the comparator 78 is electrically attached to the connecting junction of the resistors 80 and 82. Further, a resistor 84 connects the positive input terminal 76 of the comparator 78 to the output terminal 86 of the comparator 78, and a resistor 88 provides electrical connection between the high voltage terminal of the zener diode 44 and the output terminal of the comparator 86.

The resistors 80 and 82 establish a constant voltage at the negative terminal of the comparator 78. The ratio of the resistance of the resistor 80 to the total resistance of resistors 80 and 82 determines the voltage at the negative terminal of the comparator 78. During a time of low ambient light, i.e., at night, the output of the comparator 78 is high. As the intensity of the ambient light on the photo cell 72 increases, the resistance of the photo cell decreases, causing a decrease of the voltage at the positive input terminal of the comparator 78. The output of the comparator 78, which is high during the night, switches to ground as the resistance of the photo cell reaches a predetermined value set by the resistors 74. The resistor 84 provides hysteresis to assure positive switching ratio of the comparator 78.

With further reference to FIG. 3, a resistor 90 is connected between the output of comparator 78 and a capacitor 92 at a circuit junction 94. The other terminal of the capacitor 92 is electrically connected to the anode of the diode 62. A series combination of a resistor 96 and a rectifier diode 98, is connected in parallel to resistor 90. As the output of the comparator 78 switches from high to ground, the capacitor 92 starts discharging through the resistor 90. The resistors 96 and the rectifier diode 98 provide a path for charging up the capacitor 92 when the output of the comparator 78 switches from ground to high. The values of the resistors 90 and 96 are chosen in a manner known in the art so that the time constant for charging up the capacitor 92 is much shorter than the time constant for its discharge. This assures that the photo control circuit will not switch off the luminaire as a response to transient exposure to light sources during the night.

Further reference to FIG. 3 shows a comparator 100 whose negative input terminal is connected to the high voltage end of the capacitor 92. A series combination of resistors 102 and 104 is connected in parallel with the zener diode 44. The connecting junction of the resistors 102 and 104 is electrically connected to the positive input terminal of the comparator 100. Further, a resistor 106 is connected between the cathode terminal of the zener diode 44 and the output of the comparator 100.

As the output of the comparator 78 switches from high to ground, the capacitor 92 starts discharging through the resistor 90, thus lowering the voltage at the negative input terminal of the comparator 100. The discharging of the capacitor 92 decreases the voltage at the negative terminal of the comparator 100. When the voltage at the negative terminal of the comparator 100 reaches a value slightly lower than the voltage at its positive terminal, established by the resistors 102 and 104, its output switches from low to high. The switching of the output of the comparator 100 provides the signal for turning on the silicon rectifier 48. The resistor 108 provides hysteresis to assure positive switching ratio of the comparator 100.

With continued reference to FIG. 3, a resistor 110 connects the output terminal of the comparator 100 to the gate of the silicon controlled rectifier. The resistor 110 provides an electrical path for the current through the gate of the rectifier as the output of the comparator 100 switches from low to high, resulting in switching on the silicon controlled rectifier 48 and the AC relay coil 66. Once the silicon controlled rectifier 48 is on, it provides protection against a voltage surge because it clamps the voltage across the circuitry at the value between its anode and cathode, typically a few volts.

The illustrated circuit employs a normally closed AC relay. The same principles can be employed to design a circuit with a normally open relay for protection of a photo control against voltage surges. In such a circuit, the SCR is off during the times of relatively high ambient brightness, i.e., the day time, thus de-energizing the relay coil. The rapid rise of the voltage at the anode of the SCR during a voltage surge triggers the device which clamps the voltage across the photo control circuit before the expulsion arrester switches on. During times of relatively low ambient brightness, i.e., at night, the SCR is continuously on, thus providing protection against voltage surges before the expulsion arrester triggers.

Figure 4:
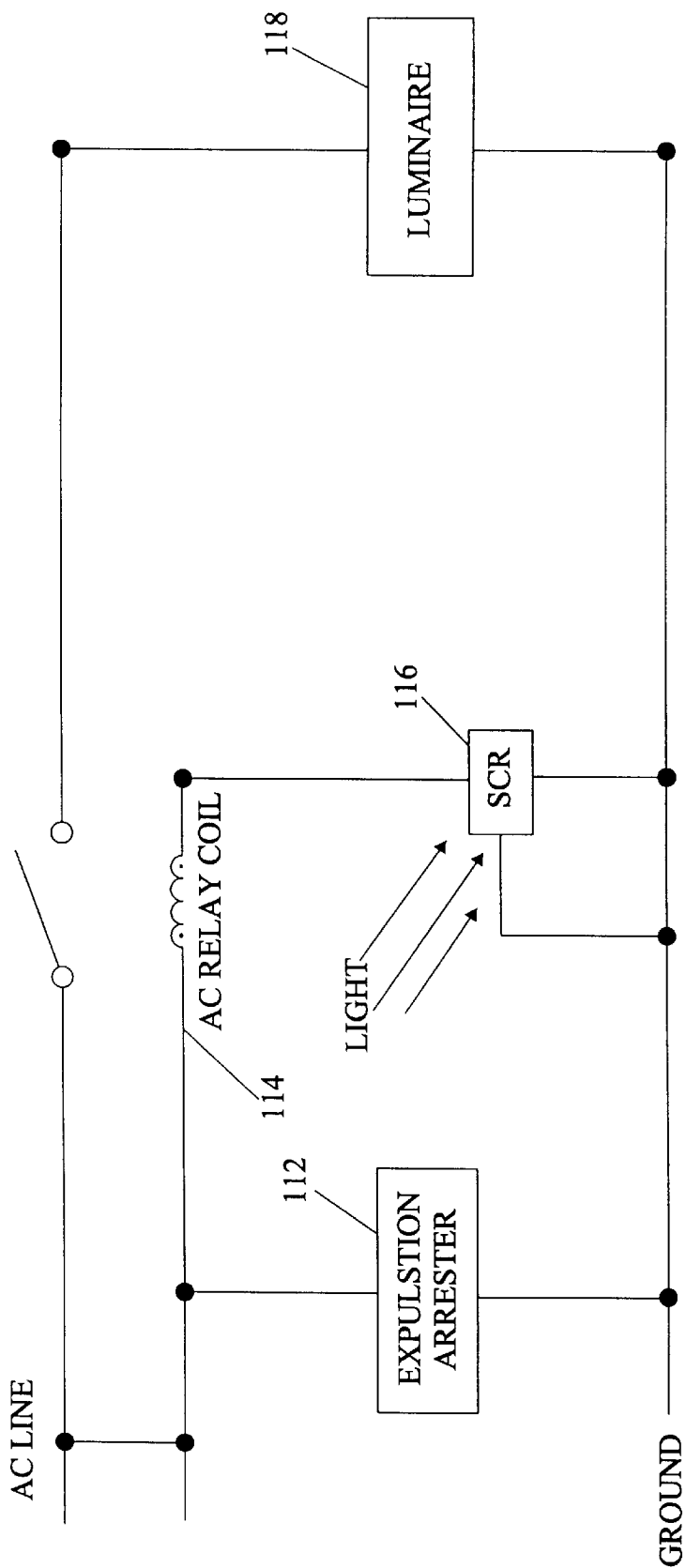
FIG. 4 shows another protective circuit according to the invention that employs a light-activated SCR, an expulsion arrester, and an AC relay coil that switches current to a luminaire.

FIG. 4 is yet another embodiment of the invention that utilizes an expulsion arrester 112 as one stage of protection against voltage surges. The expulsion arrester is connected between the AC line and ground. An AC relay coil 114 is connected at one end to the AC line, and at its other end to the anode terminal of a light-activated SCR 116, and a luminaire 118 is connected between the relay coil and ground.

This embodiment employs a normally closed relay switch. Thus, during periods of relatively high ambient light intensity, i.e., day time, the SCR is on, energizing the AC relay coil. As the ambient light intensity falls below a selected threshold, i.e., night time, the SCR switches off and de-energizes the AC relay coil which in turn switches on the luminaire.

During periods of high ambient light intensity, the SCR is continuously on, thus providing protection against voltage surges before the expulsion arrester triggers. During periods of low ambient light intensity, the SCR switches on in response to a rapid rise of voltage at its anode during a surge, thus clamping the voltage across the luminaire. Meanwhile, the AC relay coil limits the current through the SCR, thus protecting it from damage. As the surge voltage exceeds approximately 2500 V, the expulsion arrester begins to conduct, thus providing further protection from the surge.

Figure 5:
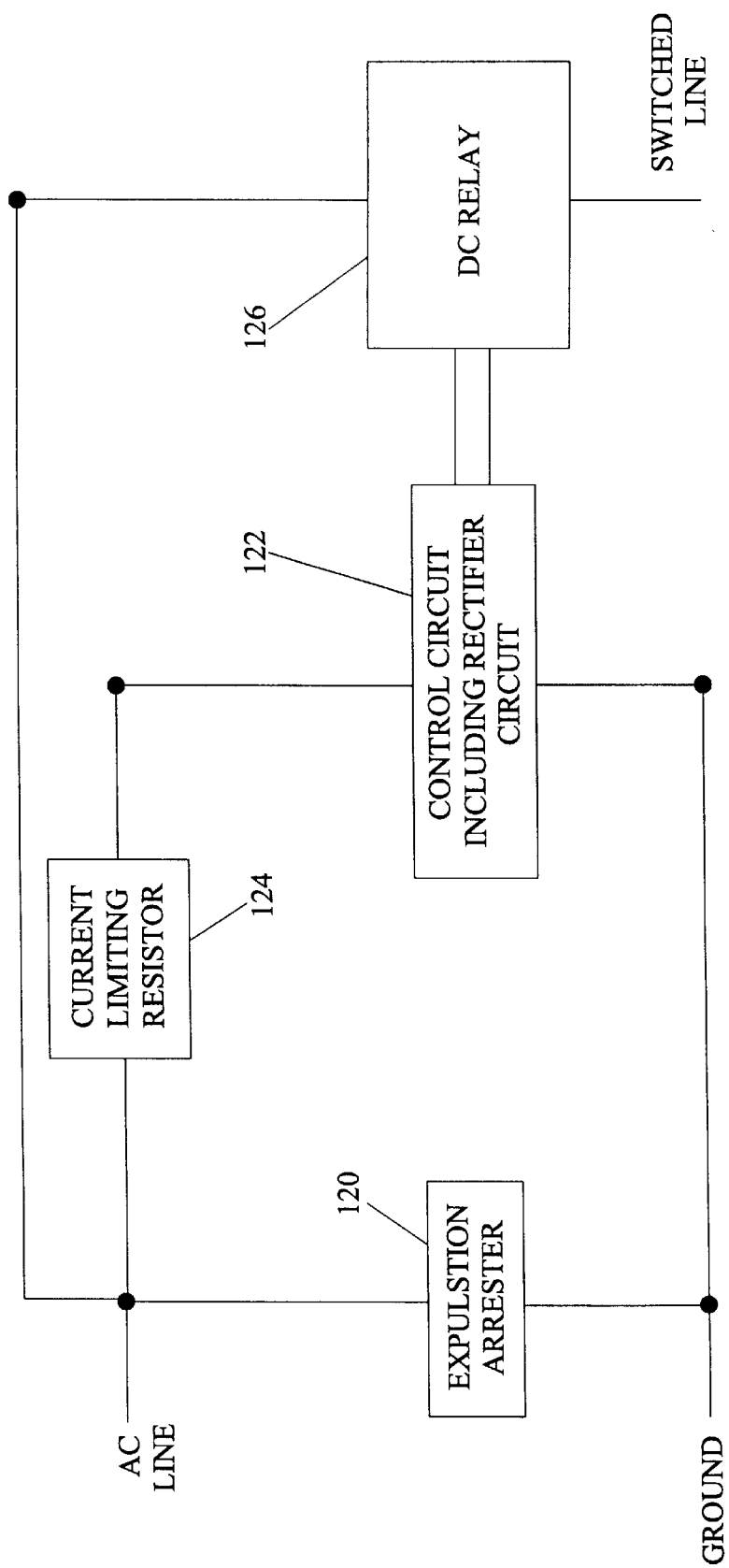
FIG. 5 shows a control circuit for switching a DC relay and having a protective circuit according to the invention with a current limiting resistor and an expulsion arrester.

FIG. 5 illustrates a voltage surge protection circuit that, unlike the previous embodiments which utilize AC relays, employs a direct current ("DC") relay coil. The circuit includes an expulsion arrester 120 that is connected between the AC line and ground. Further, a functional stage 122 that comprises a control circuit and a rectifier is connected in a parallel electrical path to the expulsion arrester. Further reference to FIG. 5 shows a current limiting resistor 124 that is connected between the high voltage terminals of the expulsion arrester and the control circuit. One terminal of a DC relay coil 126 is connected to the AC line and its other terminal to the device that needs to be switched, e.g., a luminaire. The coil terminals of the DC relay are attached to the control circuit.

The control circuit supplies the DC relay with a requisite DC current and also controls switching of the relay. The current limiting resistor is chosen in a manner known in the art to provide adequate current to the control circuit during normal operating conditions, and to limit the current during a voltage surge. As the voltage during a surge exceeds approximately 2500 V, the expulsion arrester triggers to supply a low impedance path to ground, thus providing further protection against the surge.

Figure 6:
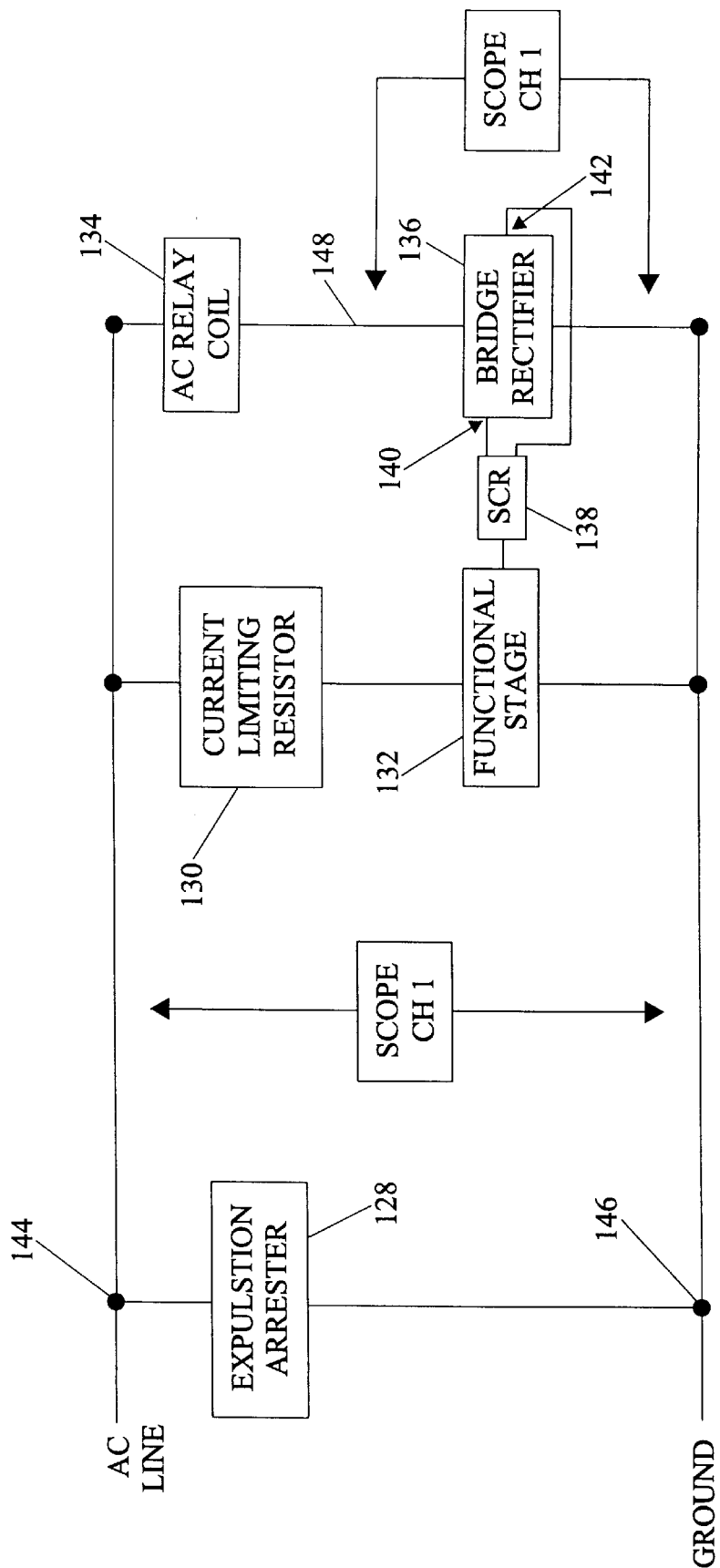
FIG. 6 is a schematic diagram of a circuit according to one embodiment of the invention, utilized to observe the responses of an expulsion arrester and of an SCR to applied voltage surges.

As further illustrations of the functions of an expulsion arrester, and an SCR, and the interaction between the SCR and the expulsion arrester in clamping a surge voltage, the circuit of FIG. 6 was utilized to record the waveforms of FIGS. 7, 8, 9, 10, and 11.

Reference to FIG. 6 shows that an expulsion arrester 128 is connected between the AC line and ground. A series combination of a current limiting resistor 130 and a functional stage 132 is connected in a parallel electrical path to the expulsion arrester.

Further, a series combination of an AC relay coil 134 and a bridge rectifier 136 is connected in parallel to the expulsion arrester.

Further reference to FIG. 6 illustrates that an SCR 138 is connected at its anode to junction 140 of the bridge rectifier, at its cathode to junction 142 of the bridge rectifier, and at its gate terminal to the functional stage. To obtain the waveforms of FIGS. 7, 8, 9, 10, and 11, an oscilloscope channel monitored the voltage across the expulsion arrester between junctions 144 and 146, and another channel monitored the voltage between junction 148 of the bridge rectifier and ground.

Figure 7:
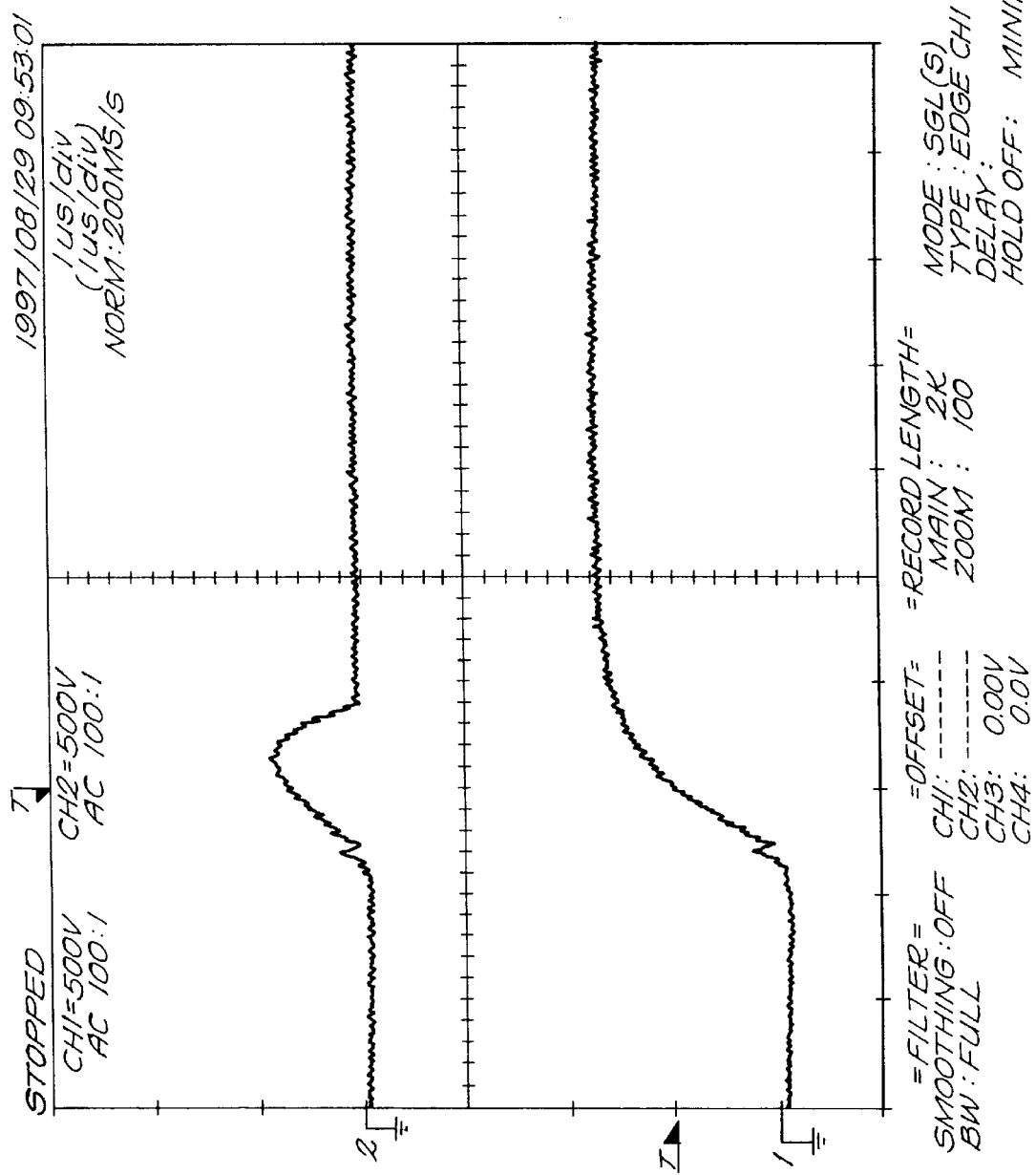
FIG. 7 presents two wave forms measured during the operation of the circuit of FIG. 6, the lower trace indicating the voltage between the AC line and ground and the upper trace indicating the voltage across an SCR during a voltage pulse.

The waveforms of FIG. 7 show that a surge voltage of 900 V applied between the AC line and ground of the circuit of FIG. 6, rising to its maximum amplitude in about 3 microseconds, triggers the SCR at a value of 400 V. The SCR then clamps the voltage across the bridge rectifier. The expulsion arrester does not trigger because the maximum value of the surge voltage, 900 V, is below the threshold for triggering the arrester.

Figure 8:
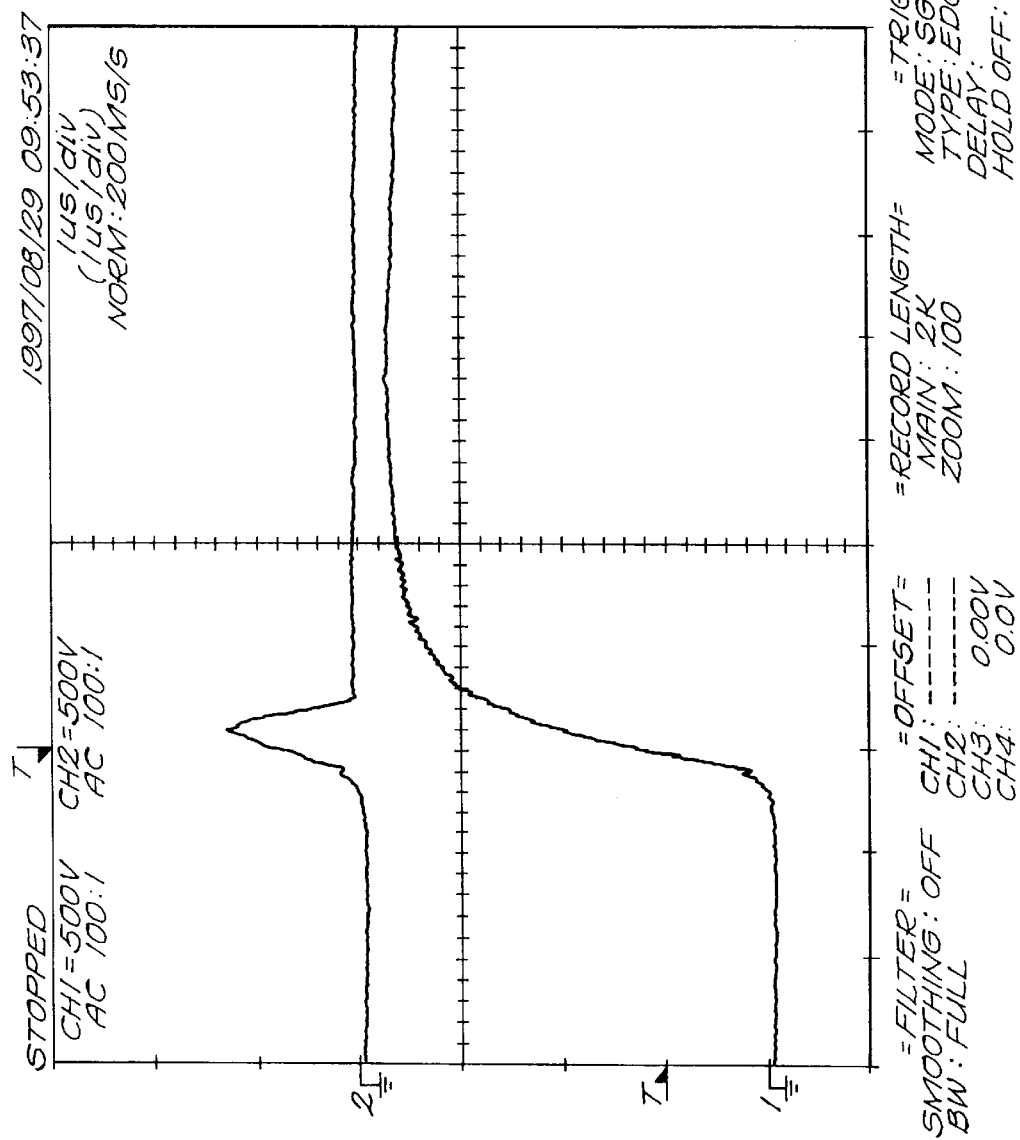
FIG. 8 presents two waveforms measured during the operation of the circuit of FIG. 6, the lower trace corresponding to the voltage between the AC line and ground and the upper trace indicating the voltage across an SCR during a voltage pulse with a rise time shorter than that of the pulse of the previous figure.

FIG. 8 illustrates the response of an SCR to a voltage pulse that reaches a maximum value of 1800 V within 3 microseconds. The SCR triggers at a surge voltage of 650 V and clamps the voltage across a bridge rectifier within 0.75 microsecond of the beginning of the pulse. Comparison of the response of the SCR to the surge pulse of FIG. 7 with its response to the surge pulse of FIG. 6 provides some information regarding the temporal response of an SCR to a voltage pulse. In particular, the more rapid rise of the surge voltage illustrated in FIG. 7 results in a more rapid response of the SCR in clamping the voltage. Similar to the example of FIG. 6, the expulsion arrester does not trigger in this case because the maximum value of the surge voltage, 1800 V, is still below the threshold for triggering the arrester.

Figure 9:
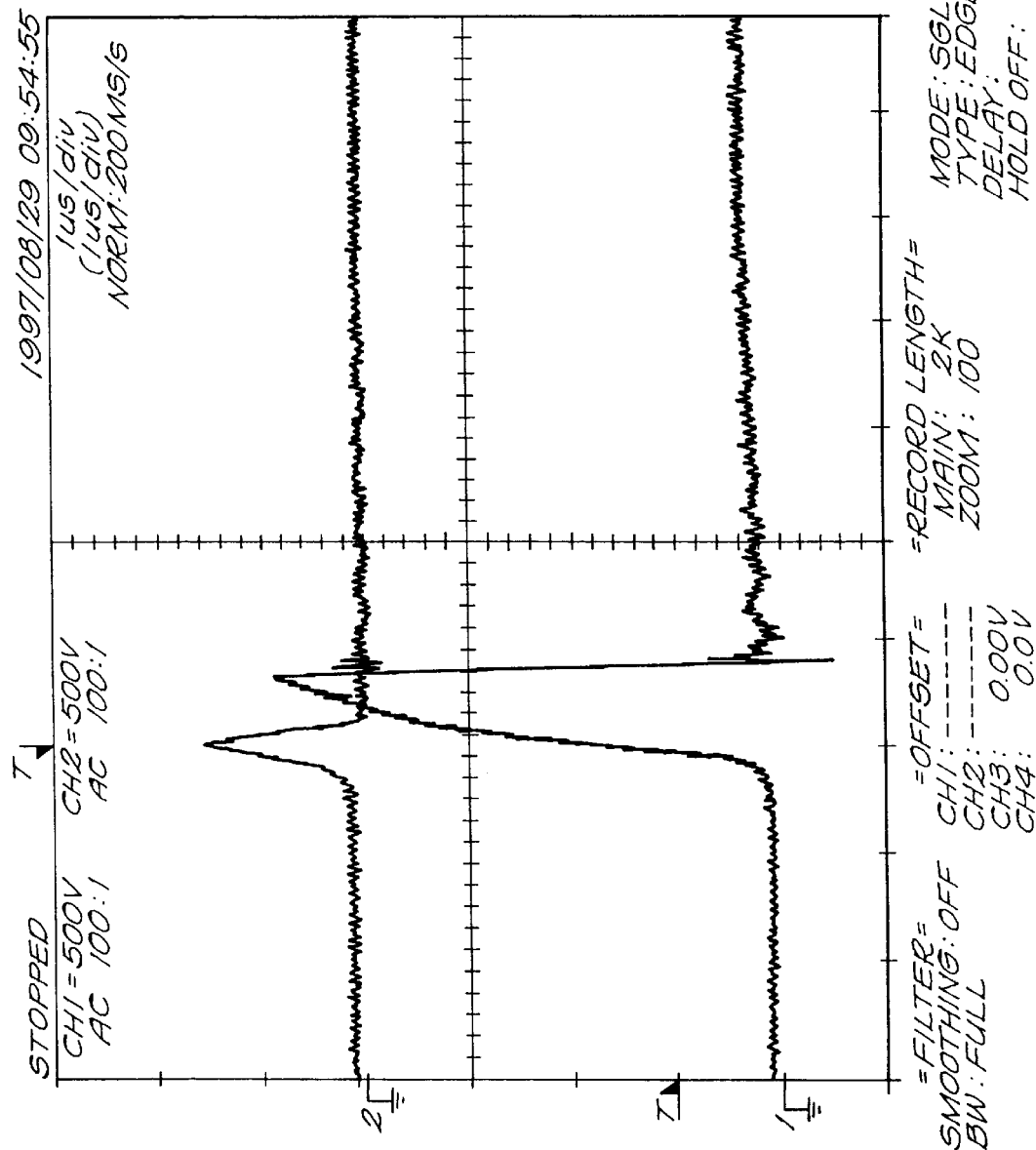
FIG. 9 shows the response of an SCR and an expulsion arrester to the application of a 6000 V surge pulse across the circuit of FIG. 6.

The waveforms of FIG. 9 were obtained by application of a pulse of 3000 V across the AC line and ground of the circuit shown in FIG. 6. These waveforms illustrate that the surge voltage triggers the arrester at a voltage of approximately 2500 V, which in turn causes the voltage across the arrester to decay to a low value within one micro second of the beginning of the surge. The voltage across the bridge rectifier reaches 750 V and subsequently decays to zero within 0.5 micro second of the beginning of the voltage surge, thus protecting the circuit before the triggering of the expulsion arrester.

Figure 10:
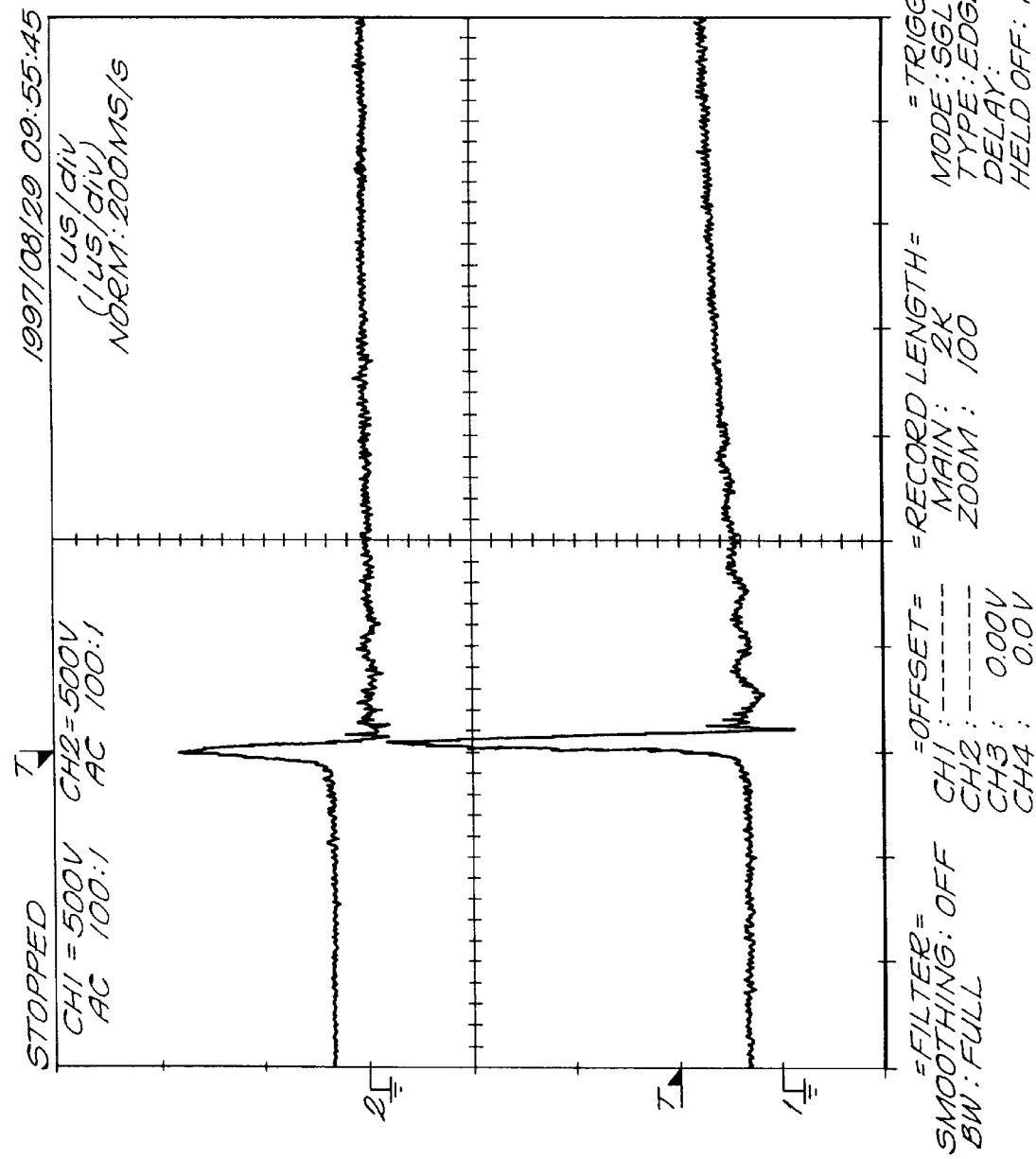
FIG. 10 presents two waveforms, measured during the operation of the circuit of FIG. 6, to illustrate the interaction between an SCR and an expulsion arrester in clamping the voltage across a control circuitry during a voltage surge.

FIG. 10 shows application of a 6000 V surge across the AC line and ground that triggers the expulsion arrester as the voltage across the arrester reaches approximately 2500 V within 0.25 microsecond of the beginning of the surge. The figure shows that the SCR clamps the voltage across the bridge rectifier as the voltage rises to approximately 800 V, before the expulsion arrester triggers.

Figure 11:
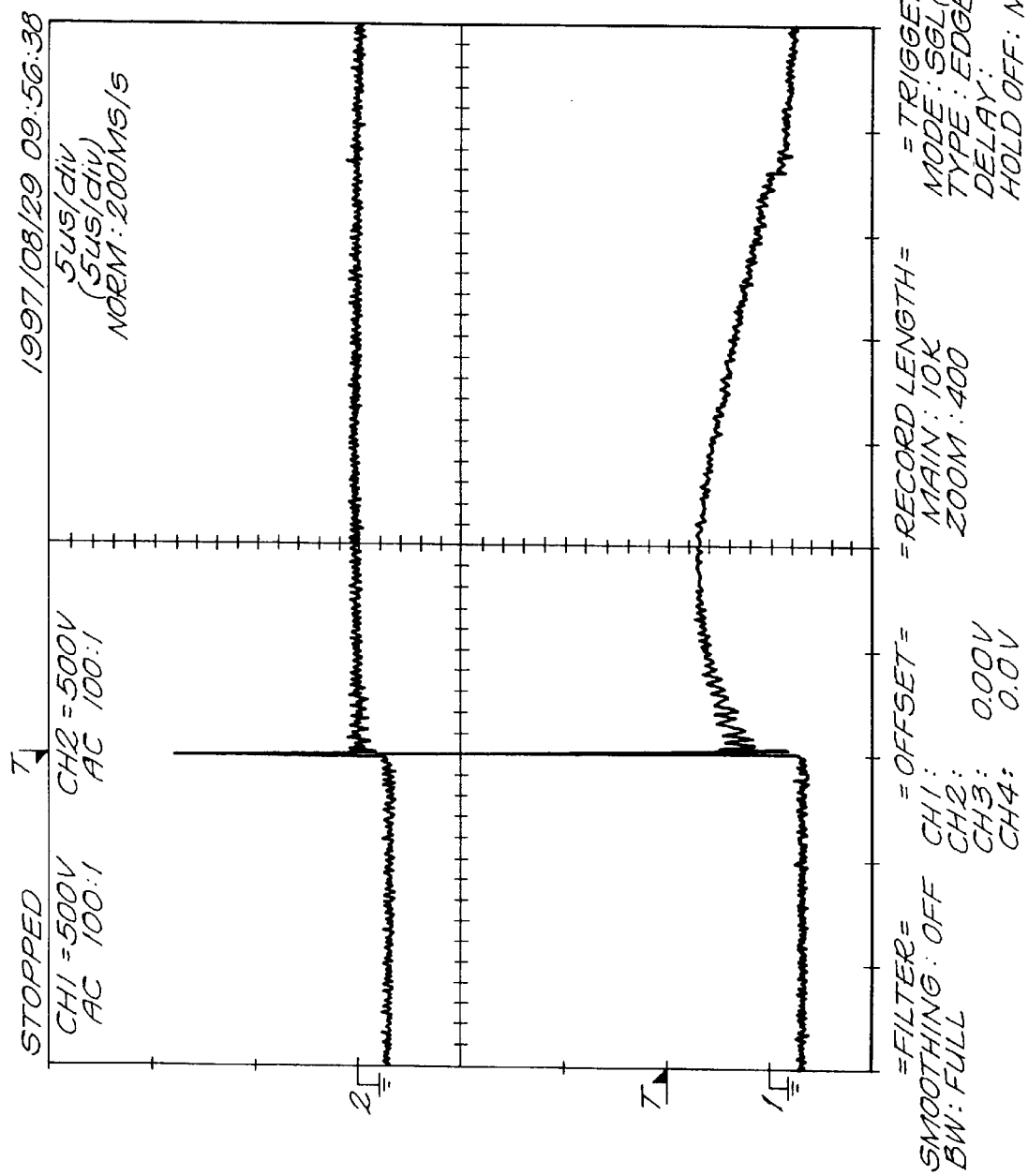
FIG. 11 shows the response of the circuit of FIG. 6 to a voltage surge with a duration of 20 micro seconds.

FIG. 11 illustrates that an SCR clamps the voltage during a surge pulse that lasts approximately 30 microseconds. The wave forms of this figure were obtained by measuring the response of the circuit of FIG. 6 to a surge pulse with a duration of approximately 30 microseconds. As the upper trace FIG. 11 shows, after the initial spike, the voltage across the circuit remains clamped throughout the duration of the surge.

Thus, the invention attains the objectives set forth above by providing effective protection of semiconductor circuitry against line voltage surges, and attains the aforementioned advantages without requiring incorporation of metal oxide varistors in the surge protector.

Having described the invention, what is claimed as new and secured by Letter Patent is:

1. Voltage surge protector apparatus for a semiconductor circuit having at least one functional stage arranged to receive electrical operating power from a pair of power conductors, said voltage surge protector apparatus comprising in combination
   (a) a first electrical element having a first circuit path connected between said pair of power conductors and including an expulsion arrester electrically in series in said circuit path, said expulsion arrester being normally non-conductive and becoming conductive in response to a voltage applied thereto from said power conductors in excess of a first threshold, and
   (b) a second electrical element in series in a second circuit path connected between said pair of power conductors, said second element providing a low impedance electrical path in parallel to said semiconductor circuit at voltages on said power conductors in excess of a second threshold, said second threshold being less than said first threshold.

2. Voltage surge protector apparatus according to claim 1, further comprising a third electrical element having a resistive impedance and arranged in series with one of said power conductors to limit the current drawn by said functional stage.

3. Voltage surge protector apparatus according to claim 1, wherein said functional stage comprises a control circuit for a relay load-switching device.

4. Voltage surge protector apparatus according to claim 1, wherein said functional stage comprises a photo control circuit.

5. Voltage surge protector apparatus according to claim 1, further comprising a resistor connected in an electrical path in series with said expulsion arrester, said resistor having a positive thermal coefficient of resistance.

6. Voltage surge protector apparatus according to claim 1, further comprising a third electrical element connected in series in an electrical path between said pair of power conductors, said element having a non-linear electrical impedance, said impedance being substantially less than the impedance of said semiconductor circuit at voltages on said power lines in excess of a third threshold, said third threshold being less than said second threshold.

7. Voltage surge protector apparatus according to claim 6, wherein said electrical element includes a zener diode.

8. Voltage surge protector apparatus according to claim 6, wherein said electrical element comprises a resistor in series with a zener diode, said resistor having a selected value to hold current through said zener diode above a selected threshold.

9. Voltage surge protector apparatus according to claim 1, in which said second element has at least a first conduction state, said conduction state having said low impedance at voltages on said power lines in excess of said second threshold, said low impedance being less than the impedance of said semiconductor circuit at said power-line voltages.

10. Voltage surge protector apparatus according to claim 9, in which said second element has a second conduction state, said second conduction state having an impedance larger than the impedance of said semiconductor circuit at voltages on said power lines less than said second threshold.

11. Voltage surge protector apparatus according to claim 10, in which said second electrical element includes an inductive component and a semiconductor switch component having a conduction path in series in said second circuit path with the inductive impedance of said inductive component, said semiconductor switch being normally in said second conduction state and entering said first conduction state in response to a voltage applied thereto from said power conductors in excess of said second threshold.

12. Voltage surge protector apparatus according to claim 11, wherein said semiconductor switch comprises a silicon controlled rectifier.

13. Voltage surge protector apparatus according to claim 11, wherein said inductive component comprises an AC relay switch.

14. Voltage surge protector apparatus according to claim 11, wherein said semiconductor switch comprises a light-activated silicon controlled rectifier.

15. Voltage surge protector apparatus according to claim 10, in which said second electrical element includes an inductive component and a semiconductor switch component having a conduction path in series in said second circuit path with the inductive impedance of said inductive component, said semiconductor switch being normally in said first conduction state.

16. Voltage surge protector apparatus according to claim 15, wherein said semiconductor switch comprises a silicon controlled rectifier.

17. Voltage surge protector apparatus according to claim 15, wherein said inductive component comprises an AC relay switch.

18. Voltage surge protector apparatus according to claim 15, wherein said semiconductor switch comprises a light activated silicon controlled rectifier.

19. Voltage surge protector apparatus for a control circuit and a DC relay switch, said control circuit switching said DC relay switch, said apparatus comprising in combination
 (a) a first electrical element having a first circuit path connected between said pair of power conductors and including an expulsion arrester electrically in series in said circuit path, said expulsion arrester being normally non-conductive and becoming conductive in response to a voltage applied thereto from said power conductors in excess of a first threshold, and
 (b) a second electrical element having a resistive impedance and arranged in series with one of said power conductors to conduct the current drawn by said control circuit, whereby limiting current through said control circuit at voltages on said power lines less than said first threshold.

20. A method for protecting a semiconductor circuit having at least one functional stage arranged to receive operating power from a pair of power conductors, said method comprising the steps of
 (a) connecting a first electrical element in series in an electrical path between the pair of power conductors, said electrical element having an expulsion arrester in series with said electrical path, said expulsion arrester being normally non-conductive and becoming conductive in response to a voltage applied thereto from said power conductors in excess of a first threshold, and
 (b) connecting a second electrical element in series in a second circuit path between said pair of power conductors, said second element providing a low impedance electrical path parallel to said semiconductor circuit at voltages on said power conductors in excess of a second threshold, said second threshold being less than said first threshold.

21. The method of claim 20, including the step of selecting said functional stage to comprise a control circuit for a relay switching device.

22. The method of claim 20, including the step of selecting said functional stage to comprise a photo control circuit.

23. The method of claim 20, further characterized by connecting a third electrical element having a resistive impedance and arranged in series with one of said power conductors to limit the current drawn by said functional stage.

24. The method of claim 20, further characterized by connecting a third electrical element in series in an electrical path between said pair of power conductors, said electrical element having a non-linear electrical impedance, said impedance being substantially less than the impedance of said semiconductor circuit at voltages on said power lines in excess of a third threshold, said third threshold being less than said second threshold.

25. The method of claim 24, including the step of selecting said electrical component with a non-linear electrical impedance to comprise a zener diode.

26. The method of claim 24, including the step of selecting said electrical component with a non-linear electrical impedance to comprise a resistor in series with a zener diode, said resistor having a selected value to hold current through said zener diode above a selected threshold.

27. The method of claim 20, including the step of selecting said second element to have at least a first conduction state, said first conduction state having said low impedance at voltages on said power lines in excess of said second threshold, said low impedance being less than the impedance of said semiconductor circuit at said power-line voltages.

28. The method of claim 27, further including the step of selecting said second element to have a second conduction state with an impedance larger than the impedance of said semiconductor circuit at voltages on said power lines less than said second threshold.

29. The method of claim 28, further including the step of selecting said second element to comprise an inductive component and a semiconductor switch component having a conduction path in series in said second circuit path with the inductive impedance of said inductive component, said semiconductor switch being normally in said first conduction state.

30. The method of claim 28, further including the step of selecting said second element to comprise an inductive component and a semiconductor switch component having a conduction path in series in said second circuit path with the inductive impedance of said inductive component, said semiconductor switch being normally in said second conduction state and entering said first conduction state in response to a voltage applied thereto from said power conductors in excess of said second threshold.

31. The method of claim 30, including the step of selecting said semiconductor switch to comprise a silicon controlled rectifier.

32. The method of claim 30, including the step of selecting said semiconductor switch to comprise a light-activated silicon controlled rectifier.

33. The method of claim 30, including the step of selecting said inductive component to comprise an AC relay switch.

34. Voltage surge protector apparatus for a semiconductor circuit having at least one functional stage arranged to receive electrical operating power from a pair of power conductors, said voltage surge protector apparatus comprising in combination
 (a) a first electrical element having a first circuit path connected between said pair of power conductors and including an expulsion arrester in series in said circuit path, said expulsion arrester being normally non-conductive and becoming conductive in response to a voltage applied thereto from said power conductors in excess of a first threshold, (b) a second electrical element in series in a second circuit path connected between said pair of power conductors, said second element providing a low impedance electrical path in parallel to said semiconductor circuit at voltages on said power conductors in excess of a second threshold, said second threshold being less than said first threshold, and (c) a third electrical element having a resistive impedance and arranged in series with one of said power conductors to limit the current drawn by said functional stage.

35. Voltage surge protector apparatus for a semiconductor circuit having at least one functional stage arranged to receive electrical operating power from a pair of power conductors, said voltage surge protector apparatus comprising in combination (a) a first electrical element having a first circuit path connected between said pair of power conductors and including an expulsion arrester electrically in series in said circuit path, said expulsion arrester being normally non-conductive and becoming conductive in response to a voltage applied thereto from said power conductors in excess of a first threshold, and (b) a second electrical element in series in a second circuit path connected between said pair of power conductors, said second element providing a low impedance electrical path in parallel to said semiconductor circuit at voltages on said power conductors in excess of a second threshold, said second threshold being less than said first threshold, said second element having at least a first conduction state, said first conduction state having said low impedance at voltages on said power lines in excess of said second threshold, said low impedance being less than the impedance of said semiconductor circuit at said power line voltages, said second element having a second conduction state, said second conduction state having an impedance larger than the impedance of said semiconductor circuit at voltages on said power lines less than said second threshold, said second element further including an inductive component and a semiconductor switch component having a conduction path in series in said second circuit path with the inductive impedance of said inductive component, said semiconductor switch being normally in said second conduction state and entering said first conduction state in response to a voltage applied thereto from said power conductors in excess of said second threshold.

36. Voltage surge apparatus according to claim 35, wherein said semiconductor switch comprises a silicon controlled rectifier.

37. Voltage surge apparatus according to claim 35, wherein said semiconductor switch comprises a light-activated silicon controlled rectifier.

38. Voltage surge protector apparatus for a semiconductor circuit having at least one functional stage arranged to receive electrical operating power from a pair of power conductors, said voltage surge protector apparatus comprising in combination (a) a first electrical element having a first circuit path connected between said pair of power conductors and including an expulsion arrester electrically in series in said circuit path, said expulsion arrester being normally non-conductive and becoming conductive in response to a voltage applied thereto from said power conductors in excess of a first threshold, and (b) a second electrical element in series in a second circuit path connected between said pair of power conductors, said second element providing a low impedance electrical path in parallel to said semiconductor circuit at voltages on said power conductors in excess of a second threshold, said second threshold being less than said first threshold, said second element having at least a first conduction state, said first conduction state having said low impedance at voltages on said power lines in excess of said second threshold, said low impedance being less than the impedance of said semiconductor circuit at said power line voltages, said second element also having a second conduction state, said second conduction state having an impedance larger than the impedance of said semiconductor circuit at voltages on said power lines less than said second threshold, said second element further including an inductive component and a semiconductor switch component having a conduction path in series in said second circuit path with the inductive impedance of said inductive component, said semiconductor switch being normally in said first conduction state.

39. Voltage surge apparatus according to claim 38, wherein said inductive component comprises an AC relay switch.

40. Voltage surge apparatus according to claim 38, wherein said semiconductor switch comprises a silicon controlled rectifier.

41. Voltage surge apparatus according to claim 38, wherein said inductive component comprises an AC relay switch.

42. Voltage surge apparatus according to claim 38, wherein said semiconductor switch comprises a light activated silicon controlled rectifier.

43. Voltage surge protector apparatus for a semiconductor circuit having at least one functional stage arranged to receive electrical operating power from a pair of power conductors, said voltage surge protector apparatus comprising in combination (a) a first electrical element having a first circuit path connected between said pair of power conductors and including an expulsion arrester in series in said circuit path and further including a resistor electrically connected in series with said expulsion arrester, said resistor having a positive thermal coefficient of resistance, said expulsion arrester being normally non-conductive and becoming conductive in response to a voltage applied thereto from said power conductors in excess of a first threshold, and (b) a second electrical element in series in a second circuit path connected between said pair of power conductors, said second element providing a low impedance electrical path in parallel to said semiconductor circuit at voltages on said power conductors in excess of a second threshold, said second threshold being less than said first threshold.

44. A method for protecting a semiconductor circuit having at least one functional stage arranged to receive operating power from a pair of power conductors, said method comprising the steps of (a) connecting a first electrical element in series in an electrical path between the pair of power conductors, said electrical element having an expulsion arrester in series with said electrical path, said expulsion arrester being normally non-conductive and becoming conductive in response to a voltage applied thereto from said power conductors in excess of a first threshold, and (b) connecting a second electrical element in series in a second circuit path between said pair of power conductors, said second element having at least a first conduction state to provide a low impedance electrical path parallel to said semiconductor circuit at voltages on said power conductors in excess of a second threshold, said second threshold being less than said first threshold, and said low impedance being less than the impedance of said semiconductor circuit at said power line voltages, said second element further having a second conduction state with an impedance larger than the impedance of said semiconductor circuit at voltages on said power lines less than said second threshold, and said second element comprising an inductive component and a semiconductor switch component having a conduction path in series in said second circuit path with the inductive impedance of said inductive component, said semiconductor switch being normally in said second conduction state and entering said first conduction state in response to a voltage applied thereto from said power conductors in excess of said second threshold.

45. The method of claim 44, including the step of selecting said semiconductor switch to comprise a silicon controlled rectifier.

46. The method of claim 44, including the step of selecting said semiconductor switch to comprise a light-activated silicon controlled rectifier.

47. The method of claim 44, including the step of selecting said inductive component to comprise an AC relay switch.

48. A method for protecting a semiconductor circuit having at least one functional stage arranged to receive operating power from a pair of power conductors, said method comprising the steps of (a) connecting a first electrical element in series in an electrical path between the pair of power conductors, said electrical element having an expulsion arrester in series with said electrical path, said expulsion arrester being normally non-conductive and becoming conductive in response to a voltage applied thereto from said power conductors in excess of a first threshold, and (b) connecting a second electrical element in series in a second circuit path between said pair of power conductors, said second element having at least a first conduction state to provide a low impedance electrical path parallel to said semiconductor circuit at voltages on said power conductors in excess of a second threshold, said second threshold being less than said first threshold, and said low impedance being less than the impedance of said semiconductor circuit at said power line voltages, said second element further having a second conduction state with an impedance larger than the impedance of said semiconductor circuit at voltages on said power lines less than said second threshold, and said second element comprising an inductive component and semiconductor switch component having a conduction path in series in said second circuit path with the inductive impedance of said inductive component, said semiconductor switch being normally in said first conduction state.

49. A method for protecting a semiconductor circuit having at least one functional stage arranged to receive operating power from a pair of power conductors, said method comprising (a) connecting a first electrical element in series in an electrical path between the pair of power conductors, said electrical element having an expulsion arrester in series with said electrical path, said expulsion arrester being normally non-conductive and becoming conductive in response to a voltage applied thereto from said power conductors in excess of a first threshold, (b) connecting a second electrical element in series in a second circuit path between said pair of power conductors, said second element providing a low impedance electrical path parallel to said semiconductor circuit at voltages on said power conductors in excess of a second threshold, said second threshold being less than said first threshold, and (c) connecting a third electrical element having a resistive impedance and arranged in series with one of said power conductors to limit the current drawn by said functional stage.

50. A method for protecting a semiconductor circuit having at least one functional stage arranged to receive operating power from a pair of power conductors, said method comprising the steps of (a) connecting a first electrical element in series in an electrical path between the pair of power conductors, said electrical element having an expulsion arrester in series with said electrical path, said expulsion arrester being normally non-conductive and becoming conductive in response to a voltage applied thereto from said power conductors in excess of a first threshold, (b) connecting a second electrical element in series in a second circuit path between said pair of power conductors, said second element providing a low impedance electrical path parallel to said semiconductor circuit at voltages on said power conductors in excess of a second threshold, said second threshold being less than said first threshold, and (c) connecting a third electrical element in series in an electrical path between said pair of power conductors, said electrical element having a non-linear electrical impedance, said impedance being substantially less than the impedance of said semiconductor circuit at voltages on said power lines in excess of a third threshold, said third threshold being less than said second threshold, said third electrical element comprising a resistor in series with a zener diode, said resistor having a selected value to hold current through said zener diode above a selected threshold.

51. Voltage surge protector apparatus for a semiconductor circuit having at least one functional stage arranged to receive electrical operating power from a pair of power conductors, said voltage surge protector apparatus comprising in combination (a) a first electrical element having a first circuit path connected between said pair of power conductors and including an expulsion arrester electrically in series in said circuit path, said expulsion arrester being normally non-conductive and becoming conductive in response to a voltage applied thereto from said power conductors in excess of a first threshold, and (b) a second electrical element in series in a second circuit path connected between said pair of power conductors, said second element providing a low impedance electrical path in parallel to said semiconductor circuit at voltages on said power conductors in excess of a second threshold, said second threshold being less than said first threshold, said second circuit path further including a third electrical element in series with said second element such that said third element limits current through said second element to protect said second element from damage during said voltage surge, said second element normally providing an open circuit upon damage due to an excessive voltage.

52. Voltage surge protector according to claim 51, further characterized by said second element being responsive to repetitive voltage surges.

53. Voltage surge protector according to claim 51, wherein said second electrical element is an electrical circuit component other than an MOV-type device.

54. Voltage surge protector apparatus for a semiconductor circuit having at least one functional stage arranged to receive electrical operating power from a pair of power conductors, said voltage surge protector apparatus comprising in combination (a) a first electrical element having a first circuit path connected between said pair of power conductors and including an expulsion arrester electrically in series in said circuit path, said expulsion arrester being normally non-conductive and becoming conductive in response to a voltage applied thereto from said power conductors in excess of a first threshold, said first threshold being above a voltage that damages an MOV-type device, and (b) a second electrical element in series in a second circuit path connected between said pair of power conductors, said second element providing a low impedance electrical path in parallel to said semiconductor circuit at voltages on said power conductors in excess of a second threshold, said second threshold being less than said first threshold.

55. Voltage surge protector according to claim 54, wherein said first threshold is approximately 2500 volts.

56. Voltage surge protector according to claim 55, wherein said second element is an electrical circuit element other than an MOV-type device.

* * * * *